(12) United States Patent
Xie et al.

(10) Patent No.: US 11,194,985 B2
(45) Date of Patent: Dec. 7, 2021

(54) APPARATUS FOR FINGERPRINT DETECTION AND ELECTRONIC DEVICE

(71) Applicant: SHENZHEN GOODIX TECHNOLOGY CO., LTD., Shenzhen (CN)

(72) Inventors: Hao Xie, Shenzhen (CN); Jianyang Zhang, Shenzhen (CN)

(73) Assignee: SHENZHEN GOODIX TECHNOLOGY CO., LTD., Shenzhen (CN)

(*) Notice: Subject to any disclaimer, the term of this patent is extended or adjusted under 35 U.S.C. 154(b) by 93 days.

(21) Appl. No.: 16/697,148

(22) Filed: Nov. 26, 2019

(65) Prior Publication Data

US 2021/0064844 A1 Mar. 4, 2021

Related U.S. Application Data

(63) Continuation of application No. PCT/CN2019/103120, filed on Aug. 28, 2019.

(51) Int. Cl.
*G06K 9/00* (2006.01)
*G06F 1/3234* (2019.01)

(52) U.S. Cl.
CPC ....... *G06K 9/00013* (2013.01); *G06F 1/3243* (2013.01); *G06K 9/00087* (2013.01)

(58) Field of Classification Search
None
See application file for complete search history.

(56) References Cited

U.S. PATENT DOCUMENTS

| | | |
|---|---|---|
| 2017/0270342 A1 | 9/2017 | He et al. |
| 2019/0026521 A1* | 1/2019 | Du .................. G06K 9/0002 |
| 2020/0097699 A1 | 3/2020 | Zeng et al. |
| 2020/0226344 A1 | 7/2020 | Wu et al. |

FOREIGN PATENT DOCUMENTS

| | | |
|---|---|---|
| CN | 1523878 A | 8/2004 |
| CN | 101360394 A | 2/2009 |
| CN | 107589576 A | 1/2018 |
| CN | 108899336 A | 11/2018 |
| CN | 109358706 A | 2/2019 |
| CN | 109416737 A | 3/2019 |
| CN | 109416739 A | 3/2019 |
| CN | 109637367 A | 4/2019 |
| CN | 109726618 A | 5/2019 |
| CN | 208903234 U | 5/2019 |

OTHER PUBLICATIONS

English machine translation of Chinese patent publication CN108899336A (Year: 2018).*

* cited by examiner

*Primary Examiner* — Nicholas J Lee
(74) *Attorney, Agent, or Firm* — Scully Scott Murphy & Presser

(57) ABSTRACT

Provided is an apparatus for fingerprint detection, where the apparatus includes a sensor chip array and an MCU, the sensor chip array includes a first chip set in which chips multiplex a first signal line and a second chip set in which chips multiplex a second signal line, where the chips in the first chip set and the chips in the second chip set are alternately arranged in each row and each column, and the MCU is configured to: control one first chip in the first chip set to perform fingerprint detection on a finger on the display screen at a time; and/or, control one second chip in the second chip set to perform fingerprint detection on the finger at the time.

13 Claims, 5 Drawing Sheets

APPARATUS FOR FINGERPRINT DETECTION AND ELECTRONIC DEVICE

CROSS-REFERENCE TO RELATED APPLICATIONS

This application is a continuation of International Application No. PCT/CN2019/103120, filed on Aug. 28, 2019, the disclosure of which is hereby incorporated by reference in its entirety.

TECHNICAL FIELD

The present application relates to the field of fingerprint identification, and more particularly, to an apparatus for fingerprint detection and an electronic device.

BACKGROUND

Optical under-screen fingerprint identification technology refers that an optical fingerprint module captures an optical signal formed by reflection or transmittance of light by a finger. Since the optical signal carries fingerprint information of the finger, under-screen fingerprint identification is realized. The optical fingerprint module may include multiple sensor chips to realize large area fingerprint detection. However, this leads to increases in corresponding devices and traces, which increases structural complexity of the optical fingerprint module and increases power consumption as well.

SUMMARY

Embodiments of the present application provide an apparatus for fingerprint detection and an electronic device. The apparatus has lower structural complexity.

In a first aspect, provided is an apparatus for fingerprint detection, where the apparatus is disposed under a display screen of an electronic device to implement under-screen optical fingerprint detection, and includes a sensor chip array and an MCU, the sensor chip array includes a first chip set in which chips multiplex a first signal line and a second chip set in which chips multiplex a second signal line, where the chips in the first chip set and the chips in the second chip set are alternately arranged in each row and each column of the sensor chip array, and the MCU is configured to: control one first chip in the first chip set to perform fingerprint detection on a finger on the display screen at a time, where the first chip communicates with the MCU by using the first signal line; and/or, control one second chip in the second chip set to perform fingerprint detection on the finger at the time, where the second chip communicates with the MCU by using the second signal line.

In this solution, a fingerprint sensor chip array in a fingerprint detection apparatus is divided into two chip sets; and chips in the two chip sets are alternately arranged in each row and each column of the sensor chip array. In this way, probability that a finger is simultaneously pressed above two chips in the same chip set is lower. Therefore, by setting each of chips in each chip set to multiplex one signal line, and controlling only one chip in the same chip set to perform fingerprint detection at a time, a trace in a fingerprint detection apparatus could be reduced, so that the fingerprint detection apparatus is more compact in structure and power consumption is also saved by avoiding simultaneous working of a large number of sensor chips.

In one possible implementation manner, the first signal line and the second signal line are configured to transmit at least one of fingerprint data, a clock signal and a reset signal.

In one possible implementation manner, the first chip set and the second chip set communicate with the MCU by any one of the following communication methods: serial peripheral interface (SPI) communication, universal asynchronous receiver/transmitter (UART) communication, and inter integrated circuit (I2C) communication.

In one possible implementation manner, each chip in the sensor chip array uses a separate signal line to perform transmission of a chip selection (CS) signal and an interrupt (INT) signal with the MCU.

In one possible implementation manner, the MCU is configured to: receive an instruction sent by a processor of the electronic device, and control, based on the instruction, the first chip and/or the second chip to perform fingerprint detection at the time.

In one possible implementation manner, a power supply of each chip in the first chip set shares a power capacitor and/or a power for a same functional module of each chip shares a power capacitor; and a power supply of each chip in the second chip set shares a power capacitor and/or a power for a same functional module of each chip shares a power capacitor.

In one possible implementation manner, the power for the same functional module includes: an analog power for the same functional module and/or a digital power for the same functional module.

In one possible implementation manner, the power capacitor is a decoupling capacitor.

In a second aspect, provided is an apparatus for fingerprint detection, where the apparatus is disposed under a display screen of an electronic device to implement under-screen optical fingerprint detection, and includes a sensor chip array and a micro-programmed control unit (MCU), the sensor chip array includes a first chip set and a second chip set, a power supply of each chip in the first chip set shares a power capacitor and/or a power for a same functional module of each chip shares a power capacitor, and a power supply of each chip in the second chip set shares a power capacitor and/or a power for a same functional module of each chip shares a power capacitor, where sensor chips in the first chip set and sensor chips in the second chip set are alternately arranged in each row and each column of the sensor chip array, and the MCU is configured to: control one chip in the first chip set to perform fingerprint detection on a finger on the display screen at a time; and/or, control one chip in the second chip set to perform fingerprint detection on the finger at the time.

In this solution, a fingerprint sensor chip array in a fingerprint detection apparatus is divided into two chip sets; and chips in the two chip sets are alternately arranged in each row and each column of the sensor chip array. In this way, probability that a finger is simultaneously pressed above two chips in the same chip set is lower. Therefore, by setting multiple chips in one chip set to share a power capacitor, and controlling only one chip in the same chip set to perform fingerprint detection at a time, the number of capacitors in a fingerprint detection apparatus could be reduced, so that the fingerprint detection apparatus is more compact in structure and power consumption is also saved by avoiding simultaneous working of a large number of sensor chips.

In one possible implementation manner, the power for the same functional module includes: an analog power for the same functional module and/or a digital power for the same functional module.

In one possible implementation manner, the power capacitor is a decoupling capacitor.

In a third aspect, provided is an electronic device, including a display screen, a processor, and the apparatus for fingerprint detection according to the first aspect or any possible implementation manner of the first aspect, or the apparatus for fingerprint detection according to the second aspect or any possible implementation manner of the second aspect.

The processor is connected to an MCU to control a sensor chip array in the apparatus through the MCU to perform fingerprint detection.

DESCRIPTION OF EMBODIMENTS

Technical solutions of the present application are described below in combination with accompanying drawings.

It should be understood that embodiments of the present application may be applied to a fingerprint system, including but not limited to an optical, ultrasonic or other fingerprint identification system and a medical diagnostic product based on optical, ultrasonic or other fingerprint imaging. The embodiments of the present application are only described by an example of an optical fingerprint system, which should not constitute any limitation to the embodiments of the present application, and the embodiments of the present application are also applicable to other systems using an optical, ultrasonic or other imaging technology or the like.

As a common application scenario, the optical fingerprint system provided in an embodiment of the present application may be applied to a smart phone, a tablet computer, and other mobile terminals having a display screen or other electronic devices. More specifically, in the foregoing electronic device, an optical fingerprint module may be disposed in a partial region or an entire region under a display screen, thereby forming an under-display optical fingerprint system. Alternatively, the optical fingerprint module may be partially or entirely integrated into the interior of the display screen of the electronic device to form an in-display optical fingerprint system.

Optical under-screen fingerprint identification technology uses light returned from a top surface of a display component of a device for fingerprint sensing and other sensing operations. The returned light carries information of an object such as a finger in contact with the top surface, and optical fingerprint detection of a particular optical sensor module located under a display screen is implemented by capturing and detecting the returned light by the finger. An optical sensor module can be designed to achieve a desired optical imaging by properly configuring optical elements for capturing and detecting the returned light.

Figure 1:
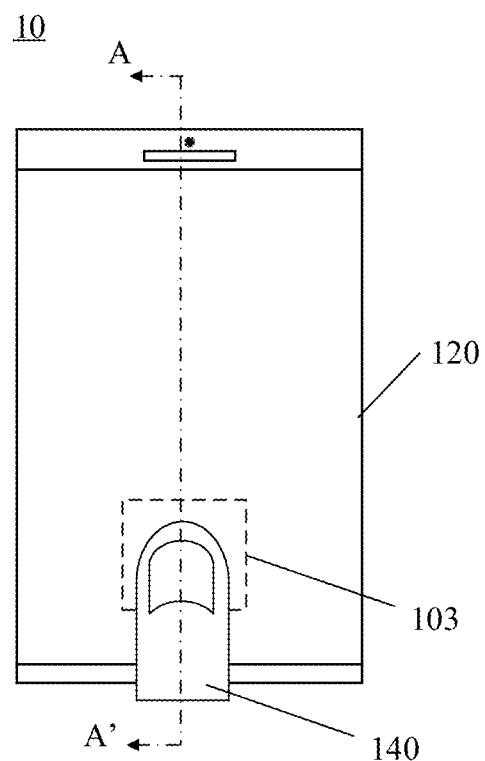
FIG. 1 and FIG. 3 are schematic diagrams of an electronic device to which the present application is applicable.
Figure 2:
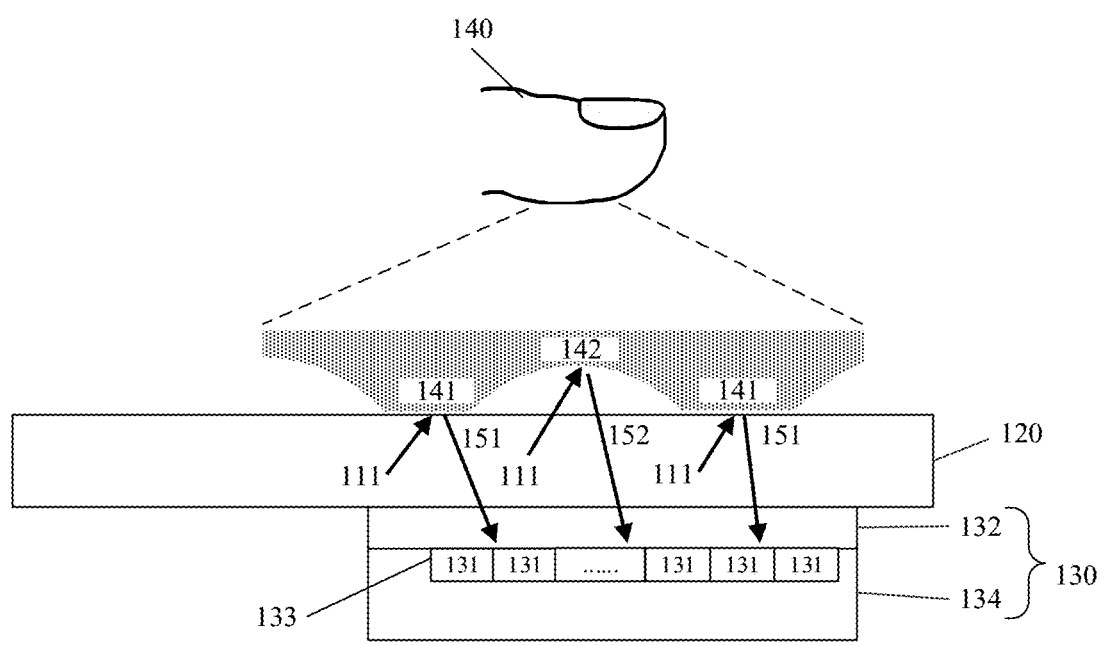
FIG. 2 and FIG. 4 are schematic cross-sectional diagrams of the electronic device shown in FIG. 1 and FIG. 3 taken along an A-A' direction, respectively.
Figure 3:
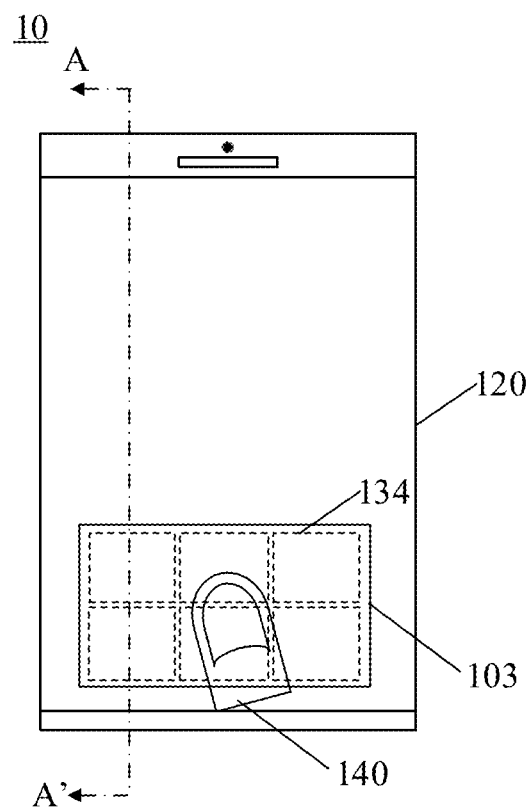
Figure 4:
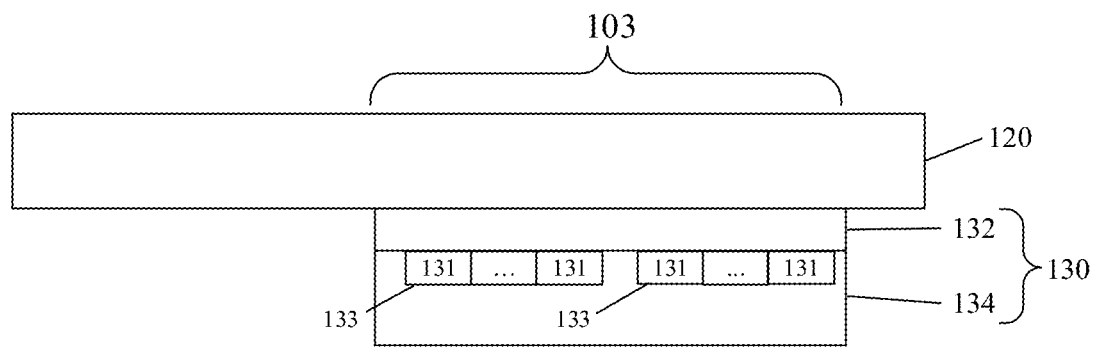

FIG. 1 and FIG. 3 are schematic diagrams of an electronic device to which the present application is applicable. FIG. 1 and FIG. 3 are schematic oriented diagrams of an electronic device 10; and FIG. 2 and FIG. 4 are partial schematic cross-sectional diagrams of the electronic device 10 shown in FIG. 1 and FIG. 3 taken along an A-A' direction, respectively.

The electronic device 10 includes a display screen 120 and an optical fingerprint module 130. The optical fingerprint module 130 is disposed in a partial region under the display screen 120. The optical fingerprint module 130 includes an optical fingerprint sensor 134 that includes a sensing array 133 having a plurality of optical sensing units 131 (which may also be referred to as pixels, photosensitive pixels, pixel units, etc.). A region where the sensing array 133 is located or a sensing region of the sensing array 133 is a fingerprint detecting region 103 of the optical fingerprint module 130. As shown in FIG. 1, the fingerprint detecting region 103 is located within a display region of the display screen 120. In an alternative embodiment, the optical fingerprint module 130 may also be disposed at other positions, such as a side of the display screen 120 or an edge non-light transmitting region of the electronic device 10, and an optical signal from at least part of the display region of the display screen 120 is directed to the optical fingerprint module 130 through a light path design, such that the fingerprint detecting region 103 is actually located in the display region of the display screen 120.

It should be understood that an area of the fingerprint detecting region 103 may be different from an area of the sensing array 133 of the optical fingerprint module 130. For example, the area of the fingerprint detecting region 103 of the optical fingerprint module 130 is larger than the area of the sensing array 133 of the optical fingerprint module 130 through a light path design such as lens imaging, reflective folding, or light convergence or reflection, etc. In other alternative implementation manners, if a light path is directed in a manner of light collimation for example, the area of the fingerprint detecting region 103 of the optical fingerprint module 130 may also be designed to be substantially identical with the area of the sensing array 133 of the optical fingerprint module 130.

Therefore, when a user needs to unlock the electronic device 10 or perform other fingerprint verification, a fingerprint input can be implemented merely by pressing a finger on the fingerprint detecting region 103 in the display screen 120. Since fingerprint detection may be implemented in the screen, there is no need to exclusively reserve space for a front surface of the electronic device 10 adopting the foregoing structure to set a fingerprint button (such as a Home button), so that a full screen solution may be adopted; that is, the display region of the display screen 120 may be substantially extended to an entire front surface of the electronic device 10.

As an optional implementation manner, as shown in FIG. 2, the optical fingerprint module 130 includes a light detecting portion 134 and an optical component 132. The light detecting portion 134 includes the sensing array 133 and a readout circuit and other auxiliary circuits electrically connected to the sensing array 133, and may be fabricated on a die by a semiconductor process, to form an optical fingerprint chip or an optical fingerprint sensor 134, which is also referred to as a sensor chip or a chip, etc. The sensing array 133 is specifically a photodetector array including a plurality of photo detectors distributed in an array, and the photo detectors may serve as the optical sensing units as described above. The optical component 132 may be disposed above the sensing array 133 of the light detecting portion 134, and may specifically include a filter layer, a light directing layer or a light path directing structure, and other optical elements. The filter layer may be used to filter ambient light passing through a finger, and the light directing layer is mainly used to direct reflected light reflected from a finger surface to the sensing array 133 for optical detection.

In a specific implementation, the optical component 132 and the light detecting portion 134 may be encapsulated in the same optical fingerprint member. For example, the optical component 132 and the light detecting portion 134 may be encapsulated in the same optical fingerprint chip, or the optical component 132 may be disposed outside a chip where the light detecting portion 134 is located, for example, the optical component 132 is attached above the chip, or a part of elements of the optical component 132 are integrated into the chip.

There are various implementations for the light directing layer of the optical component 132. For example, the light directing layer may be specifically a collimator layer fabricated on a semiconductor silicon wafer and having a plurality of collimating units or micro-pore arrays, and the collimating units may be specifically a hole. Light in the reflected light reflected from the finger that is vertically incident on the collimating unit may pass through the collimating unit and be received by the optical sensing unit below the collimating unit, and light with an excessively large incident angle is attenuated through multiple reflection inside the collimating unit. Therefore, each optical sensing unit may substantially only receive the reflected light reflected from a fingerprint pattern right above the optical sensing unit, and thus the sensing array 133 may detect a fingerprint image of the finger.

In another implementation manner, the light directing layer may also be an optical lens layer having one or more lens units, for example, a lens group composed of one or more aspheric lenses, for converging reflected light reflected from a finger to the sensing array 133 of the light detecting portion 134 below the optical lens layer, so that the sensing array 133 may perform imaging based on the reflected light so as to obtain a fingerprint image of the finger. Optionally, the optical lens layer may be provided with a pinhole in a light path of the lens unit(s), and the pinhole may cooperate with the optical lens layer to expand a field of view of the optical fingerprint module 130, to improve a fingerprint imaging effect of the optical fingerprint module 130.

In other implementation manners, the light directing layer may also specifically adopt a micro-lens layer, the micro-lens layer has a micro-lens array constituted by a plurality of micro-lenses, and may be formed above the sensing array 133 of the light detecting portion 134 by a semiconductor growth process or other processes, and each micro-lens may correspond to one of the sensing units in the sensing array 133 respectively. Other optical film layers such as a dielectric layer or a passivation layer may be formed between the micro-lens layer and the sensing unit. Further, a light blocking layer (or referred to as a light shielding layer, a light resisting layer, etc.) having a micro-pore may also be formed between the micro-lens layer and the sensing unit, where the micro-pore is formed between the corresponding micro-lens and the sensing unit, and the light blocking layer may block optical interference between adjacent micro-lenses and the sensing units, such that light corresponding to the sensing unit is converged to the interior of the micro-pore through the micro-lens and is transmitted to the sensing unit via the micro-pore to perform optical fingerprint imaging.

It should be understood that several implementations of the above-described light directing layer may be used alone or in combination. For example, a micro-lens layer may be further disposed above or below the collimator layer or the optical lens layer. Certainly, when the collimator layer or the optical lens layer is used in combination with the micro-lens layer, the specific laminated structure or light path may require to be adjusted according to actual needs.

As an optional implementation manner, the display screen 120 may adopt a display screen with a self-emitting display unit, for example, an organic light-emitting diode (OLED) display screen or a micro light-emitting diode (Micro-LED) display screen. As an example, in a case where an OLED display screen is adopted, the optical fingerprint module 130 may use a display unit (that is, an OLED light source) of the OLED display screen 120 located at the fingerprint detecting region 103 as an excitation light source for optical fingerprint detection. When a finger 140 is pressed against the fingerprint detecting region 103, the display screen 120 emits a beam of light 111 to a finger 140 above the fingerprint detecting region 103, and the light 111 is reflected by a surface of the finger 140 to form reflected light or form scattered light after scattering inside the finger 140. In related patent applications, the reflected light and scattered light are also collectively referred to as reflected light for convenience of description. Since a ridge 141 and a valley 142 of a fingerprint have different light reflecting abilities, reflected light 151 from the ridge of the fingerprint and reflected light 152 from the valley of the fingerprint have different light intensities. After passing through the optical component 132, the reflected light is received by the sensing array 133 in the optical fingerprint module 130 and converted into a corresponding electrical signal, that is, a fingerprint detection signal. Fingerprint image data can be obtained based on the fingerprint detection signal, and fingerprint matching verification can be further performed, thereby implementing an optical fingerprint identification function in the electronic device 10.

In other implementation manners, the optical fingerprint module 130 may also use an internal light source or an external light source to provide an optical signal for fingerprint detection. In this case, the optical fingerprint module 130 may be applied to a non-self-emitting display screen, such as a liquid crystal display screen or other passive light-emitting display screens. As an example, in a case where a liquid crystal display screen having a backlight module and a liquid crystal panel is applied, in order to support under-screen fingerprint detection of the liquid crystal display screen, the optical fingerprint system of the electronic device 10 may further include an excitation light source for optical fingerprint detection. The excitation light source may specifically be an infrared light source or a light source of non-visible light with a specific wavelength, which may be disposed under the backlight module of the liquid crystal display screen or disposed in an edge region under a protective cover of the electronic device 10. The optical fingerprint module 130 may be disposed under the liquid crystal panel or the edge region of the protective cover, and by being directed over a light path, light for fingerprint detection may reach the optical fingerprint module 130. Alternatively, the optical fingerprint module 130 may also be disposed under the backlight module, and the backlight module allows the light for fingerprint detection to pass through the liquid crystal panel and the backlight module and reach the optical fingerprint module 130 by providing a via hole on film layers such as a diffusion sheet, a brightening sheet, a reflection sheet or the like, or by performing other optical designs. When the optical fingerprint module 130 uses an internal light source or an external light source to provide an optical signal for fingerprint detection, a detection principle is consistent with the foregoing description.

It should be understood that, in a specific implementation, the electronic device 10 may further include a transparent protective cover; and the cover may be a glass cover or a sapphire cover, which is located above the display screen 120 and covers a front surface of the electronic device 10. Therefore, in an embodiment of the present application, the so-called the finger being pressed against the display screen 120 actually refers to the finger being pressed against a cover above the display screen 120 or a surface of a protective layer covering the cover.

The electronic device 10 may further include a circuit board that is disposed under the optical fingerprint module 130. The optical fingerprint module 130 may be bonded to the circuit board by a back adhesive, and achieve electrical connection with the circuit board by welding of a pad and a mental wire. The optical fingerprint module 130 may achieve electrical interconnection and signal transmission with other peripheral circuits or other elements of the electronic device 10 through the circuit board. For example, the optical fingerprint module 130 may receive a control signal of a processing unit of the electronic device 10 through the circuit board, and may also output a fingerprint detection signal from the optical fingerprint module 130 to the processing unit, a control unit and the like of the electronic device 10 through the circuit board.

In some implementation manners, the optical fingerprint module 130 may only include one optical fingerprint sensor 134, and in this case, the fingerprint detecting region 103 of the optical fingerprint module 130 has a smaller area and a fixed position, and therefore, when an fingerprint input is performed, a user needs to press a finger at a specific position of the fingerprint detecting region 103, otherwise the optical fingerprint module 130 may not be able to capture a fingerprint image, thereby resulting in poor user experience. In other alternative embodiments, the optical fingerprint module 130 may include a plurality of optical fingerprint sensors 134. The plurality of optical fingerprint sensors 134 may be disposed under the display screen 120 side by side in a splicing manner, and sensing regions of the plurality of optical fingerprint sensors 134 collectively constitute the fingerprint detecting region 103 of the optical fingerprint module 130. Thus the fingerprint detecting region 103 of the optical fingerprint module 130 may be extended to a main region of a lower half part of the display screen, that is, to a customary pressing region of a finger, thereby implementing a blind-press type of fingerprint input operation. Further, when the number of the optical fingerprint sensors 134 is sufficient, the fingerprint detecting region 103 may also be extended to a half of the display region or even the entire display region, thereby achieving half-screen or full-screen fingerprint detection.

For example, in an electronic device 10 as shown in FIG. 3 and FIG. 4, an optical fingerprint module 130 in the electronic device 10 includes a plurality of optical fingerprint sensors 134, and the plurality of optical fingerprint sensors 134 may be disposed under a display screen 120 side by side in a splicing manner or the like for example, and sensing regions of the plurality of optical fingerprint sensors 134 collectively constitute a fingerprint detecting region 103 of the optical fingerprint module 130.

Optionally, corresponding to the plurality of optical fingerprint sensors 134 of the optical fingerprint module 130, an optical component 132 may include a plurality of light directing layers, with each light directing layer corresponding to one optical fingerprint sensor 134 and attached to be disposed above the corresponding optical fingerprint sensor 134, respectively. Alternatively, the plurality of optical fingerprint sensors 134 may also share an integral light directing layer, i.e., the light directing layer has a sufficiently large area to cover sensing arrays of the plurality of optical fingerprint sensors 134.

In addition, the optical component 132 may further include other optical elements, for example, a filter or other optical films, which may be disposed between the light directing layer and the optical fingerprint sensor 134, or between the display screen 120 and the light directing layer, for mainly isolating the influence of external interference light on optical fingerprint detection. The filter may be used to filter out ambient light that penetrates a finger and enters into the optical fingerprint sensors 134 via the display screen 120. Similar to the light directing layer, the filter may be separately provided for each of the optical fingerprint sensors 134 to filter interference light, or a large-area filter may also be used to simultaneously cover the plurality of optical fingerprint sensors 134.

The light directing layer may also be replaced by an optical lens, and an aperture may be formed by a light-shielding material on the optical lens to cooperate with the optical lens to converge fingerprint detection light to the optical fingerprint sensor 134 under the optical lens so as to achieve fingerprint imaging. Similarly, each optical fingerprint sensor 134 may be separately configured with an optical lens for fingerprint imaging, or the plurality of optical fingerprint sensors 134 may also utilize the same optical lens to achieve light convergence and fingerprint imaging. In other alternative embodiments, each of the optical fingerprint sensors 134 may even further have dual arrays or multiple sensing arrays (Multi-Arrays), and two or more optical lenses are simultaneously configured to cooperate with the two or more sensing arrays for optical imaging so as to reduce an imaging distance and enhance an imaging effect.

When fingerprint identification is performed using the plurality of optical fingerprint sensors 134 as shown in FIG. 3, the number of optical fingerprint sensors 134 is increased, and therefore communication lines and capacitors associated with the optical fingerprint sensors 134 are also increased, thereby increasing structure complexity of an optical fingerprint module.

An embodiment of the present application provides a fingerprint detection solution, which can make an optical fingerprint module have a more compact structure.

Hereinafter, the optical fingerprint sensor 134 in the above optical fingerprint module 130 is also referred to as a sensor chip or a chip.

Figure 5:
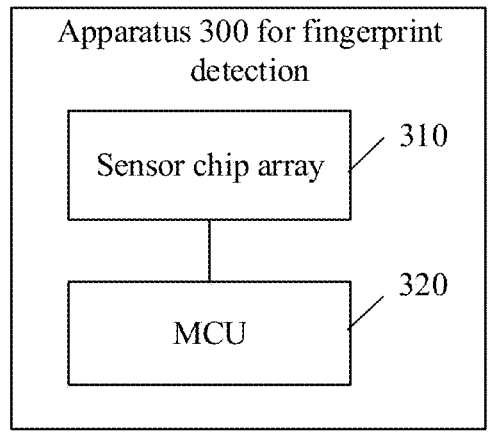
FIG. 5 is a schematic block diagram of an apparatus for fingerprint detection according to an embodiment of the present application.

FIG. 5 is a schematic block diagram of an apparatus 300 for fingerprint detection according to an embodiment of the present application. The apparatus 300 is disposed under a display screen of an electronic device to implement under-screen optical fingerprint detection. As shown in FIG. 5, the apparatus 300 includes a sensor chip array 310 and a micro-programmed control unit (MCU) 320. The sensor chip array 310 includes a first chip set 311 and a second chip set 312.

Chips in the first chip set 311 and chips in the second chip set 312 are alternately arranged in each row and each column of the sensor chip array 310.

In an implementation manner of the present application, the chips in the first chip set 311 multiplex a first signal line 321, and the chips in the second chip set 312 multiplex a second signal line 322.

The MCU 320 is configured to:

control one first chip in the first chip set 311 to perform fingerprint detection on a finger on the display screen at a time, where the first chip communicates with the MCU by using the first signal line; and/or, control one second chip in the second chip set 322 to perform fingerprint detection on the finger at the time, where the second chip communicates with the MCU by using the second signal line.

In this embodiment, a fingerprint sensor chip array in a fingerprint detection apparatus is divided into two chip sets, that is, a first chip set and a second chip set. Chips in the two chip sets are alternately arranged in each row and each column of the sensor chip array. In this way, probability that a finger is simultaneously pressed above two chips in the same chip set is lower. Therefore, by setting each of chips in each chip set to multiplex one signal line, and controlling only one chip in the same chip set to perform fingerprint detection at a time, a trace in a fingerprint detection apparatus could be reduced, so that the fingerprint detection apparatus is more compact in structure and power consumption is also saved by avoiding simultaneous working of a large number of sensor chips.

It should be understood that the sensor chip array 310 may include one or more rows of sensor chips or one or more columns of sensor chips. When the sensor chip array 310 includes only one row of sensor chips, chips in the first chip set 311 and chips in the second chip set 312 are alternately arranged in the row of the sensor chips. When the sensor chip array 310 includes only one column of sensor chips, chips in the first chip set 311 and chips in the second chip set 312 are alternately arranged in the column of the sensor chips.

Figure 6:
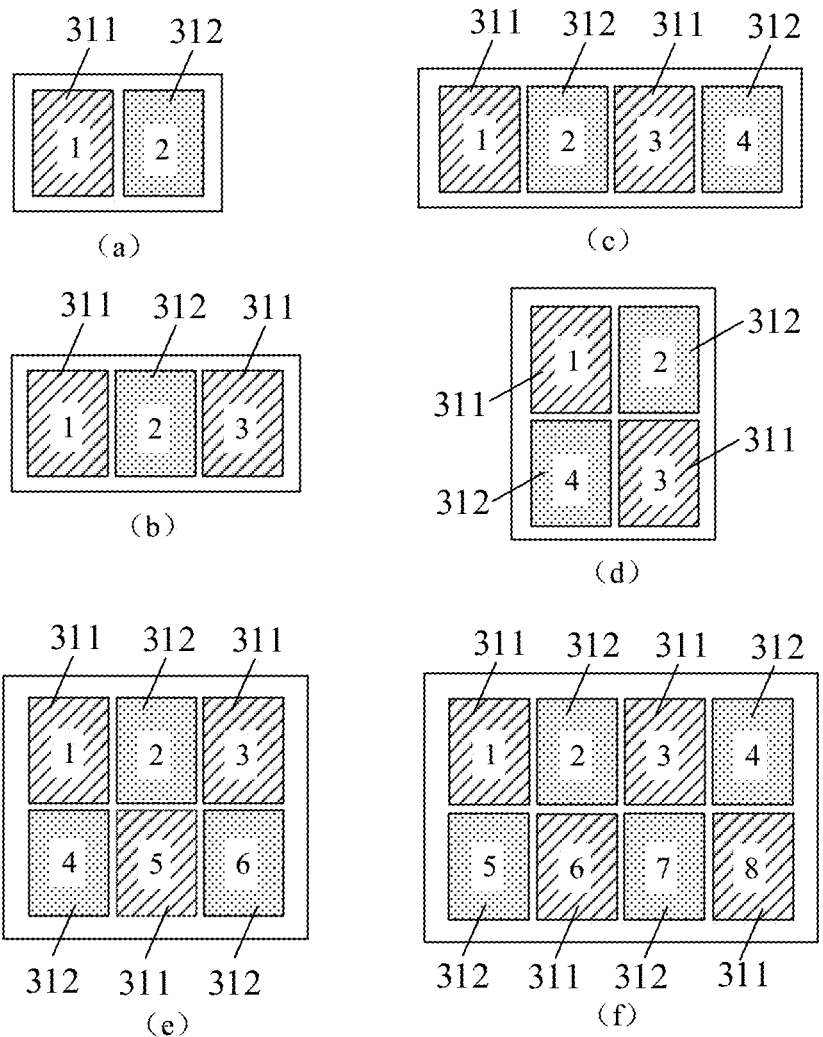
FIG. 6 is a schematic diagram of a first chip set and a second chip set according to an embodiment of the present application.

FIG. 6 illustrates several possible fingerprint detecting regions. The fingerprint detecting regions include a plurality of sub-regions corresponding to a plurality of sensor chips in a sensor chip array 310 respectively, and each of the sensor chips is used to detect a fingerprint in the corresponding sub-region.

As shown in FIG. 6 (a), the sensor chip array 310 includes two chips, and a first chip set 311 includes a chip 1 and a second chip set 312 includes a chip 2. As shown in FIG. 6 (b), the sensor chip array 310 includes three chips, and a first chip set 311 includes a chip 1 and a chip 3, and a second chip set 312 includes a chip 2. As shown in FIGS. 6 (c) and (d), the sensor chip array 310 includes four chips, and a first chip set 311 includes a chip 1 and a chip 3, and a second chip set 312 includes a chip 2 and a chip 4. As shown in FIG. 6 (e), the sensor chip array 310 includes six chips, and a first chip set 311 includes a chip 1, a chip 3 and a chip 5, and a second chip set 312 includes a chip 2, a chip 4 and a chip 6. As shown in FIG. 6 (f), the sensor chip array 310 includes eight chips, and a first chip set 311 includes a chip 1, a chip 3, a chip 6 and a chip 8 and a second chip set 312 includes a chip 2, a chip 4, a chip 5 and a chip 7.

It can be seen that in FIG. 6, non-adjacent chips or chips in diagonal positions belong to the same chip set. For example, as shown in FIG. 6 (c), since a pressing area of a finger is limited such that it is usually not so large as to cover the chip 1 and the chip 3 at the same time, or cover the chip 2 and the chip 4 at the same time, the non-adjacent chip 1 and chip 3 are used as the first chip set 311, and non-adjacent chip 2 and chip 4 are used as the second chip set 312. The first chip set 311 and the second chip set 312 can work in parallel, but only one chip in the same chip set is controlled to perform fingerprint detection each time. For example, when a finger is pressed against a region above the chip 1 of the first chip set 311 and the chip 2 of the second chip set 312, the chip 1 and the chip 2 can simultaneously detect an optical signal returned by the finger, but at this time, the chip 3 in the first chip set 311 and the chip 4 in the second chip set do not work.

For another example, as shown in FIG. 6 (e), when a finger is pressed against a region above the chip 2 and the chip 3, the chip 2 and the chip 3 can simultaneously detect an optical signal returned by the finger, but while the chip 2 and the chip 3 are working, the remaining chips in the first chip set 311 and the second chip set 312 do not work. When a finger is pressed against a region above the chip 5 and the chip 6, the chip 5 and the chip 6 can simultaneously detect an optical signal returned by the finger, but while the chip 5 and the chip 6 are working, the remaining chips in the first chip set 311 and the second chip set 312 do not work.

The number, size, and arrangement of the fingerprint sensor chips shown above are only examples, and can be adjusted according to actual needs. For example, the number of chips in the sensor chip array may further be other values, and the sensor chip array may be square or circular.

In this embodiment, the MCU 320 may be connected to a host, and the host includes a processor of an electronic device such as a master control of the electronic device. The MCU 320 may receive an instruction sent by the master control of the electronic device, and control, according to the instruction, one first chip in the first chip set 311 and/or one second chip in the second chip set 312 to perform fingerprint detection on the finger at the time.

In other words, the host is bridged by the MCU 320 to manage communication of the sensor chip array 310.

The master control of the electronic device can obtain pressing information of the finger from a touch panel, such as a pressing region and a pressing position of the finger, and determine which sensor chip of the chip set needs to be used to perform fingerprint detection on the finger according to the pressing information. The master control of the electronic device may send an instruction to the MCU 320 to instruct a certain sensor chip to perform fingerprint detection on the finger. After receiving the instruction, the MCU 320 sends the instruction to the sensor chip through the corresponding signal line, so that the sensor chip performs fingerprint detection on the finger after receiving the instruction.

The chips in the first chip set 311 multiplex a first signal line 321, and the chips in the second chip set 312 multiplex a second signal line 322. The first signal line 321 and the second signal line 322 may be configured to transmit at least one of fingerprint data (DATA), a clock signal (CLOCK), a reset signal (RESET) and other signals for example. The clock signal is used for signal reception and transmission synchronization. For example, the sensor chip needs to send captured fingerprint data to the MCU 320 according to the received clock signal so as to avoid an error code. The fingerprint data is data obtained by simply processing an optical signal returned by a finger captured by the sensor chip, and the data carries fingerprint information of the finger. The reset signal is used for restoring the sensor chip to an initial state.

For other signals, for example, a chip selection (CS) signal and an interrupt (INT) signal, each chip in the sensor chip array 310 may use a separate signal line to perform transmission of the CS signal and the INT signal with the MCU 320. The chip selection signal may be used for selecting a particular chip in each chip set for fingerprint detection.

The first signal line 321 is used only for one first chip in the first chip set 311 to communicate with the MCU 320 each time. The second signal line 322 is used only for one second chip in the second chip set 312 to communicate with MCU 320 each time. That is, the first chip and the second chip may communicate with the MCU 320 simultaneously by using the first signal line 321 and the second signal line 322, respectively, but other chips in the first chip set 311 do not communicate with the MCU 320 by using the first signal line 321 simultaneously with the first chip, and other chips in the second chip set 312 do not communicate with the MCU 320 by using the second signal line 322 simultaneously with the second chip.

Figure 7:
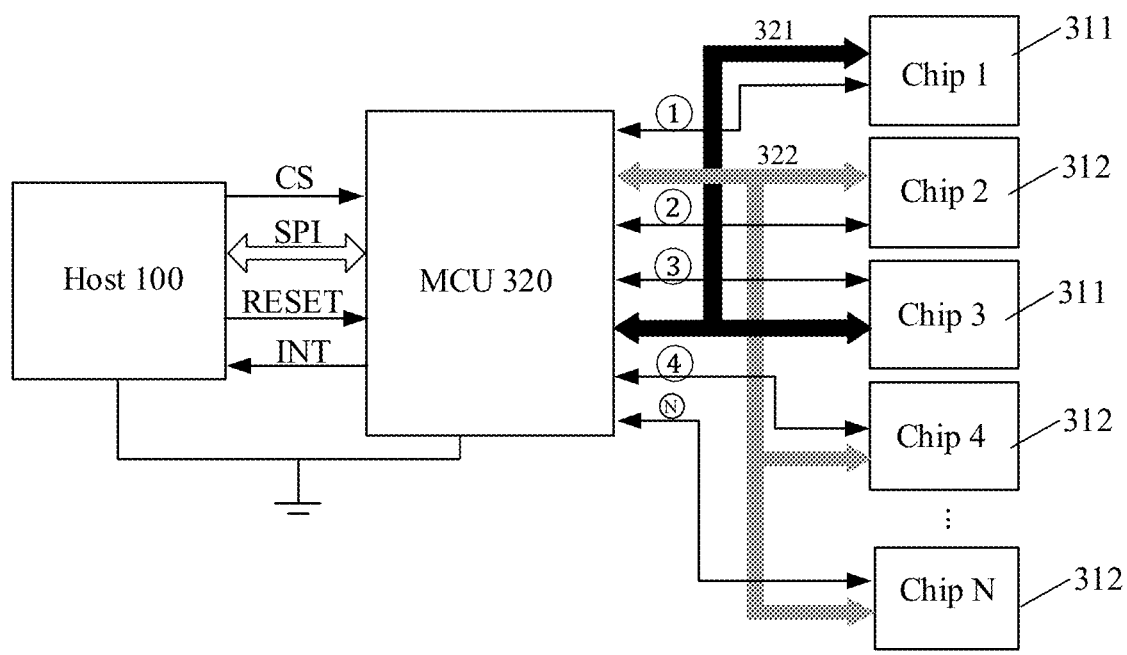
FIG. 7 is a schematic diagram of a chip set multiplexing a signal line according to an embodiment of the present application.

For example, in FIG. 7, a host 100 is bridged by an MCU 320 to manage each chip in a sensor chip array 310. The MCU 320 is connected to chips such as a chip 1, a chip 3, and the like that are not adjacent or diagonally located in a first chip set 311 through a first signal line 321, and the MCU 320 is connected to chips such as a chip 2, a chip 4, and the like that are not adjacent or diagonally located in a second chip set 312 through a second signal line 322. The first signal line 321 and the second signal line 322 are configured to transmit fingerprint data, a clock signal, a reset signal, and the like acquired by a chip of the corresponding chip set, respectively. The MCU 320 is connected to the chip 1, the chip 2, the chip 3, the chip 4, . . . , and a chip N through a signal line ①, a signal line ②, a signal line ③, a signal line ④, . . . , and a signal line Ⓝ, respectively, and the signal line ①, the signal line ②, the signal line ③, the signal line ④, . . . , and the signal line Ⓝ are configured to transmit chip selection signals and interrupt signals of the chip 1, the chip 2, the chip 3, the chip 4, . . . , and the chip N, respectively.

At a time, only one chip of the first chip set 311 is working to perform signal transmission with the MCU 320 by using the first signal line 321. At a time, only one chip of the second chip set 312 is working to perform signal transmission with the MCU 320 by using the second signal line 322.

For example, in FIG. 7, when a pressing region of a finger is located above the chip 1 and the chip 2, the host 100 transmits chip selection (CS) signals to the chip 1 and the chip 2 through the MCU 320, and the chip selection signals of the chip 1 and the chip 2 are transmitted to the chip 1 and the chip 2 through the signal line ① and the signal line ②, respectively. The chip 1 and the chip 2 are turned on to perform fingerprint detection on the finger, so as to acquire fingerprint data, and send interrupts (INT) to the host 100 by the MCU 320 through the signal line ① and the signal line ②, respectively, to notify the host 100 to take the fingerprint data. The fingerprint data acquired by the chip 1 and the chip 2 may be transmitted to the MCU 320 through the first signal line 321 and the second signal line 322, respectively, and further transmitted to the host 100. After the host 100 receives the fingerprint data, reset (RESET) signals may be sent to the chip 1 and the chip 2 by the MCU 320 through the first signal line 321 and the second signal line 322, respectively, so that the chip 1 and the chip 2 are restored to an initial state.

In FIG. 7, description is made by an example of SPI communication to illustrate a connection manner under the SPI communication. In actual applications, the sensor chip array 310 may also be controlled by other communication methods to perform fingerprint detection, such as UART communication and I2C communication.

By adopting a method of multiplexing signal lines shown in FIG. 7, on the one hand, a problem of excessive traces in the scenario of multiple sensor chips could be solved, and the number of signal lines is greatly reduced; on the other hand, since only one sensor chip in each chip set is working each time, the method is conducive to saving power consumption.

In another implementation manner of the present application, a power of each chip in the first chip set 311 shares a power capacitor; and a power of each chip in the second chip set shares a power capacitor. The MCU 320 is configured to:

control one chip in the first chip set 311 to perform fingerprint detection on a finger on the display screen at a time; and/or, control one chip in the second chip set 312 to perform fingerprint detection on the finger at the time.

In this embodiment, by setting multiple chips in one chip set to share a power capacitor, and controlling only one chip in the same chip set to perform fingerprint detection at a time, the number of capacitors in a fingerprint detection apparatus could be reduced, so that the fingerprint detection apparatus is more compact in structure and power consumption is also saved by avoiding simultaneous working of a large number of sensor chips.

The power capacitor may be, for example, a decoupling capacitor, or an uncoupling capacitor. The capacitor is connected between a power supply of a chip and the ground, and can be configured to achieve functions of electric energy storage, decoupling, noise reduction, stabilization, buffering, and the like. The power capacitor is not limited in the present application. For example, one chip set may also share other bypass capacitors.

The power of each chip in the first chip set 311 shares a power capacitor, and the power capacitor is used only for one chip in the first chip set 311 each time, but is not electrically conductive with multiple chips in the first chip set 311 simultaneously. The power of each chip in the second chip set 312 shares a power capacitor, and the power capacitor is used only for one chip in the second chip set 312 each time, but is not electrically conductive with multiple chips in the second chip set 312 simultaneously.

The foregoing power of each chip in the same chip set may include, for example, at least one of the following powers: a power supply of each chip in the same chip set, an analog power for the same functional module of each chip in the same chip set, and a digital power for the same functional module of each chip in the same chip set.

That is, a power supply of each chip in each chip set may share a power capacitor and/or a power for a same functional module of each chip in each chip set may also share a power capacitor.

Specifically, a power supply of each chip in the first chip set shares a power capacitor and/or a power for a same functional module of each chip shares a power capacitor; and a power supply of each chip in the second chip set shares a power capacitor and/or a power for a same functional module of each chip shares a power capacitor.

A power supply of a chip is, for example, an AVDD, which is used for providing total voltage to the chip. For chips of the same model, an AVDD of each chip in each chip set is the same, and may share a power capacitor.

Voltages required for different functional modules on a chip may be different, and thus powers for the different functional modules of the chip are different. The different functional modules on the chip, for example, include an analog to digital converter (ADC), a Field Programmable Gain Amplifier (FPGA), a photodiode (PD), and other functional modules.

Different functional modules on a chip have different voltage requirements during working, and the corresponding analog power and digital power are different. However, the same functional module on different chips of the same chip set usually requires the same voltage during working. Therefore, powers for the same functional module on the different chips of the same chip set can share a power capacitor. For example, a power for an ADC module of each chip in the same chip set may share a capacitor, a power for a PD module of each chip in the same chip set may share a capacitor, and the like.

Figure 8:
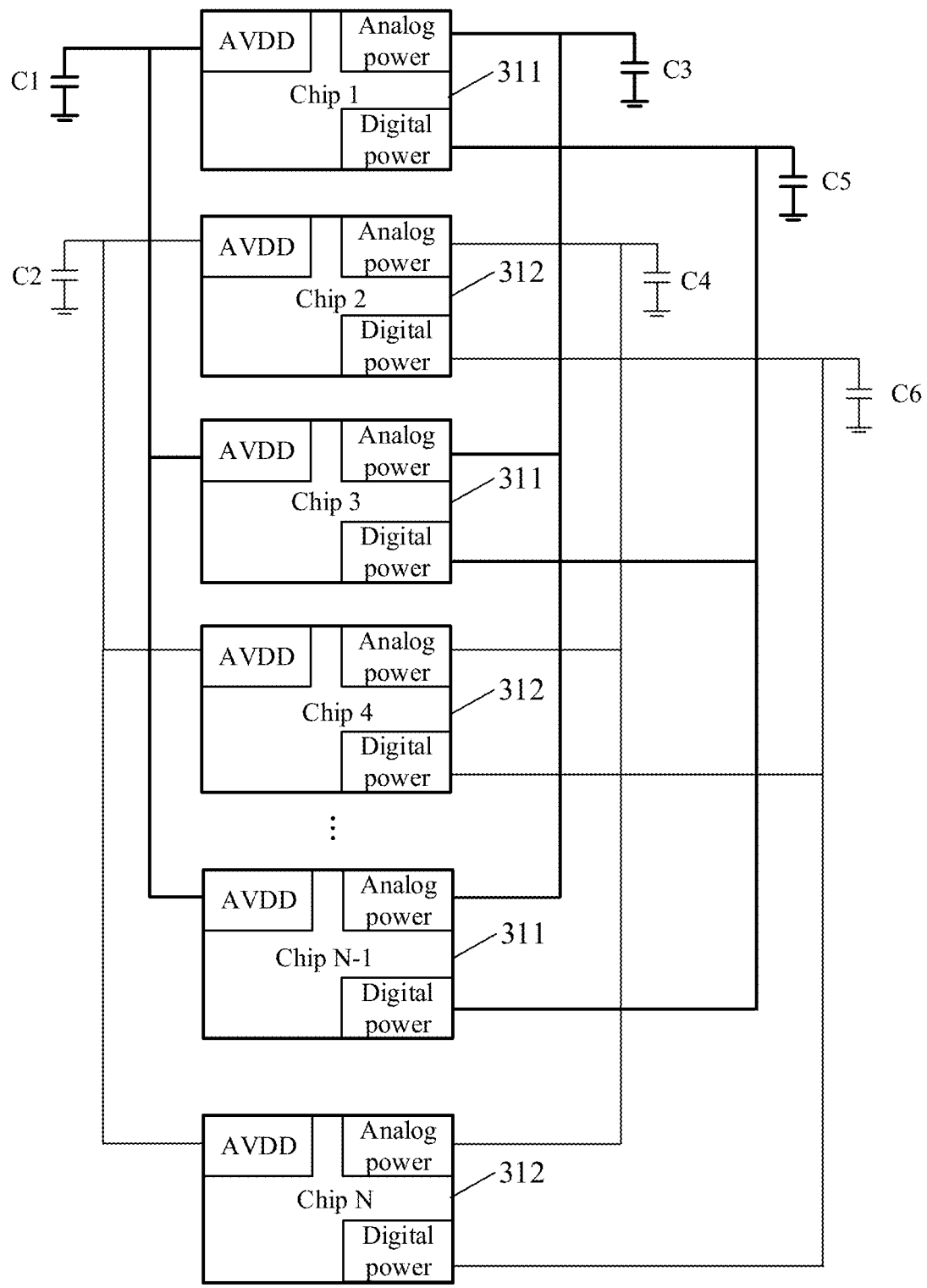
FIG. 8 is a schematic diagram of a chip set sharing a capacitor according to an embodiment of the present application.

For example, in FIG. 8, a first chip set 311 includes a chip 1, a chip 3, . . . , and a chip N−1, and a second chip set 312 includes a chip 2, a chip 4, . . . , and a chip N. An AVDD power of each chip in the first chip set 311 is connected to a capacitor C1, and an AVDD of each chip in the second chip set 312 is connected to a capacitor C2. After processing the AVDD, an analog power for each functional module with different voltage requirements can be obtained, such as an ADC, an FPGA, a PD and other functional modules. In an embodiment of the present application, in a chip set, an analog power of each chip for a same functional module and providing a same voltage shares a capacitor. In FIG. 8, for the sake of brevity, only one analog power is shown in each chip. The analog power of each chip in the first chip set 311 is connected to a capacitor C3, and the analog power of each chip in the second chip set 312 is connected to a capacitor C4.

Similarly, in FIG. 8, a digital power of each chip in the first chip set 311 is connected to a capacitor C5, and a digital power of each chip in the second chip set 312 is connected to a capacitor C6. The digital power is configured to supply power to various digital logic and input/output (I/O) interfaces.

Each power of a chip is usually managed by a power management unit (PMU). When the PMU of the chip is turned off, the chip stops working. In sensor chips sharing a capacitor, only a PMU of one of the sensor chips is turned on at a time, while PMUs inside the other sensor chips are all turned off. For example, when a PMU of one chip in the first chip set 311 is turned on, the chip can communicate with a MCU 320 through the first signal line 321 for fingerprint detection; and when a PMU of one chip in the second chip set 312 is turned on, the chip can communicate with the MCU 320 through the second signal line 322 for fingerprint detection.

By adopting a method of sharing a power capacitor shown in FIG. 8, on the one hand, the number of power capacitors could be reduced, cost could be reduced, and the structure of an apparatus 300 for fingerprint detection could be made more compact; on the other hand, since only one sensor chip in each chip set is working each time, the method is conductive to saving power consumption.

The various implementation manners described above in the embodiments of the present application may be implemented separately or in combination. This is not limited by the present application. For example, the apparatus 300 may simultaneously adopt, for example, a connection manner of multiplexing signal lines shown in FIG. 7, and a connection manner of sharing a power capacitor as shown in FIG. 8. For example, when a chip in each chip set is turned on, the chip may use shared capacitor and signal line for fingerprint detection, while the other chips in the chip set do not use the capacitor and the signal line simultaneously.

An embodiment of the present application further provides an electronic device, and the electronic device includes a display screen, a processor, and the apparatus 300 for fingerprint detection according to the above various embodiments of the present application.

The processor is connected to an MCU to control a sensor chip array 310 in the apparatus 300 through the MCU to perform fingerprint detection. The processor is, for example, a master control of the electronic device, and the MCU is, for example, the aforementioned MCU 320.

The display screen may be a normal unfolded display screen or a foldable display screen or a flexible display screen.

By way of example and not limitation, the electronic device in the embodiment of the present application may be portable or mobile computing devices such as a terminal device, a mobile phone, a tablet computer, a notebook computer, a desktop computer, a gaming device, an in-vehicle electronic device or a wearable smart device, and other electronic devices such as an electronic database, an automobile and an automated teller machine (ATM). The wearable smart device includes a smart watch or smart glasses or the like that is full-featured, large-sized, and can implement a complete or partial function without relying on a smart phone, and various types of smart wristbands, smart jewelry and other devices for physical signs monitoring that only focus on a certain type of application function, and needs to cooperate with other devices such as a smart phone.

It should be noted that, in a case of no conflict, the various embodiments and/or the technical features in the various embodiments described in the present application may be combined with each other arbitrarily, and the technical solutions obtained after the combination should also fall within the protection scope of the present application.

It should be noted that specific examples in embodiments of the present application are just for helping those skilled in the art better understand the embodiments of the present application, rather than for limiting the scope of the embodiments of the present application. Those skilled in the art can make various improvements and variations on the basis of the above embodiments, and such improvements or variations are all within the protection scope of the present application.

The foregoing descriptions are merely specific embodiments of the present application, but the protection scope of the present application is not limited thereto, those skilled in the art who are familiar with the art could readily think of variations or substitutions within the technical scope disclosed by the present application, and these variations or substitutions shall fall within the protection scope of the present application. Therefore, the protection scope of the present application shall be subject to the protection scope of the claims.

What is claimed is:

1. An apparatus for fingerprint detection, wherein the apparatus is disposed under a display screen of an electronic device to implement under-screen optical fingerprint detection, and comprises a sensor chip array and a micro-programmed control unit (MCU), the sensor chip array comprises a first chip set in which chips multiplex a first signal line and a second chip set in which chips multiplex a second signal line, wherein the chips in the first chip set and the chips in the second chip set are alternately arranged in each row and each column of the sensor chip array, and the MCU is configured to perform at least one of the following operations:

control one first chip in the first chip set to perform fingerprint detection on a finger on the display screen at a time, wherein the first chip communicates with the MCU by using the first signal line; or, control one second chip in the second chip set to perform fingerprint detection on the finger at the time, wherein the second chip communicates with the MCU by using the second signal line;

wherein a power supply of each chip in the first chip set shares a power capacitor, or a power for a same functional module of each chip shares a power capacitor, or a power supply of each chip in the second chip set shares a power capacitor, or a power for a same functional module of each chip shares a power capacitor.

2. The apparatus according to claim 1, wherein the first signal line and the second signal line are configured to transmit at least one of fingerprint data, a clock signal and a reset signal.

3. The apparatus according to claim 1, wherein the first chip set and the second chip set communicate with the MCU by any one of the following communication methods:

serial peripheral interface (SPI) communication, universal asynchronous receiver/transmitter (UART) communication, and inter integrated circuit (I2C) communication.

4. The apparatus according to claim 1, wherein each chip in the sensor chip array uses a separate signal line to perform transmission of a chip selection (CS) signal and an interrupt (INT) signal with the MCU.

5. The apparatus according to claim 1, wherein the MCU is configured to:

receive an instruction sent by a processor of the electronic device, and control, based on the instruction, the first chip and/or the second chip to perform fingerprint detection at the time.

6. The apparatus according to claim 1, wherein the power for the same functional module comprises:

an analog power for the same functional module and/or a digital power for the same functional module.

7. The apparatus according to claim 1, wherein the power capacitor is a decoupling capacitor.

8. An apparatus for fingerprint detection, wherein the apparatus is disposed under a display screen of an electronic device to implement under-screen optical fingerprint detection, and comprises a sensor chip array and a micro-programmed control unit (MCU), the sensor chip array comprises a first chip set and a second chip set, a power supply of each chip in the first chip set shares a power capacitor and/or a power for a same functional module of each chip shares a power capacitor, and a power supply of each chip in the second chip set shares a power capacitor and/or a power for a same functional module of each chip shares a power capacitor, wherein sensor chips in the first chip set and sensor chips in the second chip set are alternately arranged in each row and each column of the sensor chip array, and the MCU is configured to perform at least one of the following operations:

control one chip in the first chip set to perform fingerprint detection on a finger on the display screen at a time; or, control one chip in the second chip set to perform fingerprint detection on the finger at the time.

9. The apparatus according to claim 8, wherein the power for the same functional module comprises:

an analog power for the same functional module and/or a digital power for the same functional module.

10. The apparatus according to claim 8, wherein the power capacitor is a decoupling capacitor.

11. An electronic device, comprising a display screen, a processor, and an apparatus for fingerprint detection, wherein:

the apparatus for fingerprint detection is disposed under the display screen to implement under-screen optical fingerprint detection, and comprises a sensor chip array and a micro-programmed control unit (MCU), the sensor chip array comprises a first chip set and a second chip set, a power supply of each chip in the first chip set shares a power capacitor and/or a power for a same functional module of each chip shares a power capacitor, and a power supply of each chip in the second chip set shares a power capacitor and/or a power for a same functional module of each chip shares a power capacitor, wherein sensor chips in the first chip set and sensor chips in the second chip set are alternately arranged in each row and each column of the sensor chip array, and the MCU is configured to perform at least one of the following operations: control one chip in the first chip set to perform fingerprint detection on a finger on the display screen at a time; or, control one chip in the second chip set to perform fingerprint detection on the finger at the time;

the processor is connected to the MCU to control the sensor chip array in the apparatus for fingerprint detection to perform fingerprint detection.

12. The electronic device according to claim 11, wherein the power for the same functional module comprises:

an analog power for the same functional module and/or a digital power for the same functional module.

13. The electronic device according to claim 11, wherein the power capacitor is a decoupling capacitor.

* * * * *